US012752792B2

(12) United States Patent
Kimura et al.

(10) Patent No.: US 12,752,792 B2
(45) Date of Patent: Oct. 6, 2026

(54) WORK VEHICLE

(71) Applicant: Yanmar Holdings Co., Ltd., Osaka (JP)

(72) Inventors: Tomohiro Kimura, Osaka (JP); Nobuyuki Araki, Osaka (JP); Mizuki Kawase, Tokyo (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 21 days.

(21) Appl. No.: 18/955,847

(22) Filed: Nov. 21, 2024

(65) Prior Publication Data

US 2025/0162595 A1 May 22, 2025

(30) Foreign Application Priority Data

Nov. 22, 2023 (JP) ................................ 2023-198262

(51) Int. Cl.

*B60W 40/08* (2012.01)
*B60R 11/04* (2006.01)
*B60W 50/14* (2020.01)
*G06V 20/59* (2022.01)
*B60R 11/00* (2006.01)

(52) U.S. Cl.

CPC ............. *B60W 40/08* (2013.01); *B60R 11/04* (2013.01); *B60W 50/14* (2013.01); *G06V 20/597* (2022.01); *B60R 2011/0022* (2013.01); *B60W 2040/0827* (2013.01); *B60W 2040/0872* (2013.01); *B60W 2050/143* (2013.01); *B60W 2050/146* (2013.01); *B60W 2300/152* (2013.01); *B60W 2420/403* (2013.01); *B60W 2540/221* (2020.02); *B60W 2540/229* (2020.02)

(58) Field of Classification Search

CPC ..................................................... B60W 40/08
USPC .......................................................... 340/576
See application file for complete search history.

(56) References Cited

U.S. PATENT DOCUMENTS

2021/0227155 A1* 7/2021 Aoki .................... G06V 20/588
2022/0090362 A1* 3/2022 Yamashita ........... B60N 2/0027
2023/0035095 A1* 2/2023 Tevis ................... G06V 20/593

FOREIGN PATENT DOCUMENTS

EP 3889363 A1 10/2021
JP 2013-152700 A 8/2013
WO 2023228758 A1 11/2023

OTHER PUBLICATIONS

Extended European Search Report dated Mar. 31, 2025 issued in EP Application 24211911.3.

* cited by examiner

*Primary Examiner* — Travis R Hunnings
(74) *Attorney, Agent, or Firm* — NORTON ROSE FULBRIGHT US LLP

(57) ABSTRACT

A work vehicle includes a monitoring device that monitors the driver seated in the driver's seat, and a support member that supports the monitoring device. In a plan view, the direction perpendicular to a width direction of the driver's seat is a front-rear direction, and the side the driver faces in the front-rear direction when seated in the driver's seat is the front side. The monitoring device is arranged in a position further forward than the driver's seat, and is offset in the width direction of the driver's seat with respect to a reference axis along the front-rear direction that passes through the center of the driver's seat in the width direction. The monitoring device is supported by the support member.

10 Claims, 8 Drawing Sheets

WORK VEHICLE

CROSS-REFERENCE TO RELATED APPLICATION

This application claims priority under 35 U.S.C. § 119 to Japanese Application No. 2023-198262, filed on Nov. 22, 2023, the entire contents of which are hereby incorporated by reference in their entireties.

TECHNICAL FIELD

The present invention relates to a work vehicle.

BACKGROUND ART

For example, proposed in Patent Document 1 is a driver monitor device that captures the face of a driver of a vehicle such as a passenger car with a camera, and then uses image analysis to accurately identify inattention of the driver and issue a warning. The camera is installed on a steering column of the vehicle.

PRIOR ART DOCUMENT

Patent Document

Patent Document 1: Japanese Unexamined Patent Application Publication No. 2013-152700

SUMMARY OF INVENTION

Technical Problem

When driving a vehicle such as a passenger car, it is important to pay attention to what is in front of the vehicle. Therefore, the frequency with which a driver's line of sight is tilted in a left-right direction while driving is relatively low. Furthermore, even if a driver's the line of sight is significantly tilted in the left-right direction while driving in order to pay attention to a wider area, this is only momentary. Therefore, if the vehicle being driven is a passenger car, as described in Patent Document 1, by placing a camera on a steering column located in front of the driver, inattention of the driver can be accurately detected by the camera.

In contrast, in the case of a work vehicle such as a tractor, the driver of the work vehicle often proceeds with the work performed by the work vehicle while looking at the front wheels. In this case, the direction of the driver's line of sight is diagonally downward with respect to the front (forward) direction of the driver. In addition, in a work vehicle such as a hydraulic excavator, depending on the work location, excavation work may be performed, for example, by swinging a boom in a left-right direction while rotating an arm in an up-down direction. At this time, the direction of the driver's line of sight may sometimes be oriented diagonally upward with respect to the front direction of the driver.

Therefore, in a work vehicle in which the line of sight is often significantly tilted in the left-right direction while working, if inattention is detected by placing a camera in front of the driver, even if the line of sight movements while working do not actually correspond to inattention, the line of sight movements may sometimes be erroneously detected as corresponding to inattention. Therefore, measures to prevent erroneous detection are necessary.

The present invention has been made in order to solve the problem described above. An object of the present invention is to provide a work vehicle in which a device that monitors a driver is installed in a suitable position, and that can accurately detect a state of the driver seated in the driver's seat.

Solution to Problem

A work vehicle according to an aspect of the present invention includes: a monitoring device that monitors a driver that is seated in a driver's seat; and a support member that supports the monitoring device; wherein in a plan view, when a direction perpendicular to a width direction of the driver's seat is a front-rear direction, and a side the driver faces in the front-rear direction when seated in the driver's seat is a front side, the monitoring device is arranged in a position further forward than the driver's seat, and is offset in the width direction of the driver's seat with respect to a reference axis along the front-rear direction that passes through a center of the driver's seat in the width direction, and is supported by the support member.

Advantageous Effects of Invention

According to the configuration described above, it is possible to install a device that monitors a driver in a suitable position, and to accurately detect a state of the driver seated in the driver's seat.

DESCRIPTION OF EMBODIMENTS

Figure 1:
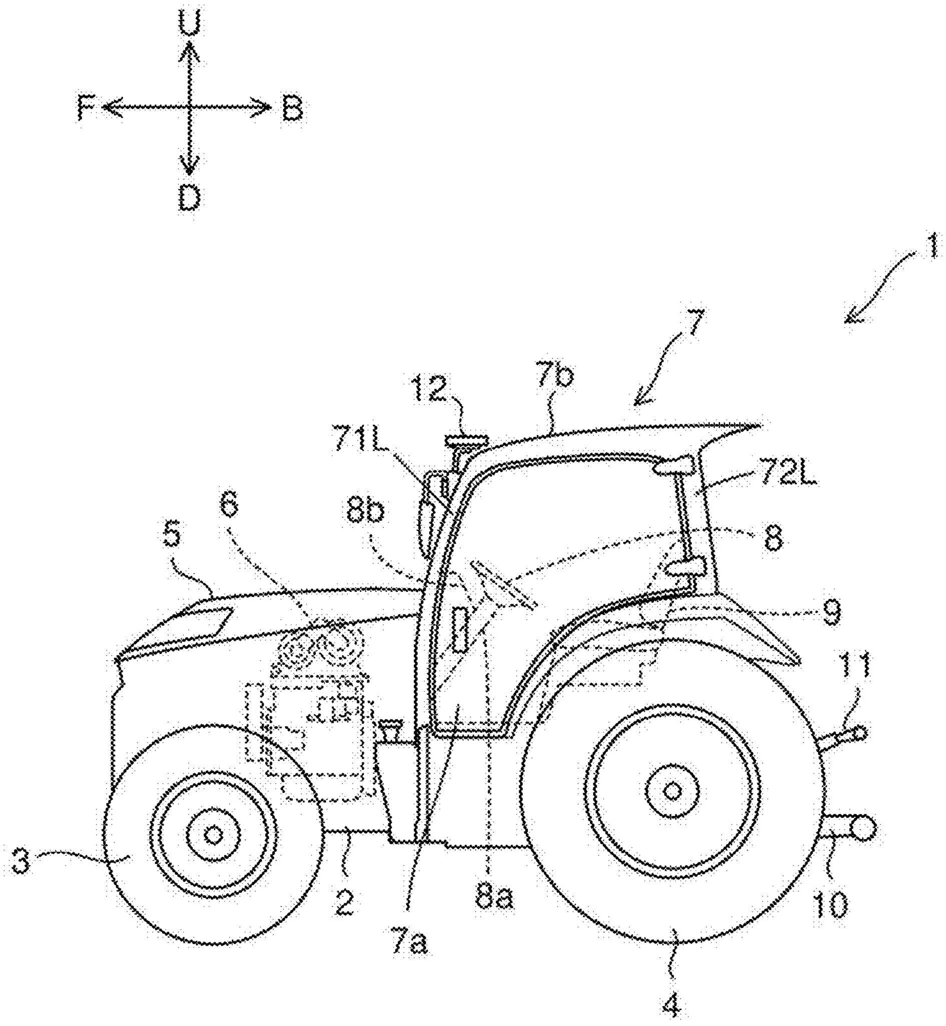
FIG. 1 is a left side view schematically showing a configuration of a tractor, which is an example of a work vehicle according to an embodiment of the present invention.

An embodiment of the present invention will be described below with reference to the drawings.

The embodiment of the present invention will be described below with reference to the drawings. In the present embodiment, a tractor will be described as an example of a work vehicle. However, in addition to a tractor, examples of the work vehicle include riding work vehicles such as a rice planter, a combine harvester, a civil engineering and construction work device (such as a hydraulic excavator), and a snowplow.

In addition, in the present specification, the directions are defined as follows. First, the width direction of a driver's seat 9 (see FIG. 1) of a tractor 1 serving as a work vehicle is defined as a left-right direction. Further, in a plan view, a direction perpendicular to the width direction of the driver's seat 9 is defined as a front-rear direction. In the front-rear direction, the side the driver seated in the driver's seat 9 faces (the front side) is defined as the "front". The opposite side, that is, the back side of the driver seated in the driver's seat 9 is defined as the "rear". In addition, the right side with respect to the forward direction of the driver seated in the driver's seat 9 is defined as the "right", and the left side is defined as the "left". The right side mentioned above is also one side in the width direction. The left side mentioned above is also another side in the width direction. Also, a gravity direction perpendicular to the front-rear direction and the left-right direction is defined as an up-down direction. The upstream side in the gravity direction is defined as "up", and the downstream side is defined as "down". In the drawings, the symbols of "F" for forward, "B" for back, "R" for right, "L" for left, "U" for up, and "D" for down will be shown as necessary.

The above definitions of the directions also apply to other work vehicles. For example, in a hydraulic excavator, because an upper rotating body rotates relative to a lower traveling body, the front-rear direction of the driver's seat provided on the upper rotating body may deviate from the direction in which the hydraulic excavator moves forward and backward. However, by defining the above directions based on the driver's seat, the arrangement and positional relationships of each member in the hydraulic excavator can be considered in the same way as in the present embodiment.

[1. Outline of Work Vehicle]

FIG. 1 is a left side view schematically showing a configuration of a tractor 1, which is an example of a work vehicle of the present embodiment. The tractor 1 includes a vehicle body 2. A ground work machine (not shown) can be attached to the rear side of the vehicle body 2. As the ground work machine, for example, a cultivator, a plow, or a fertilizer applicator can be used, but it is not limited to this.

A front part of the vehicle body 2 is supported by a pair of left and right front wheels 3. A rear part of the vehicle body 2 is supported by a pair of left and right rear wheels 4. A hood 5 is arranged on the front part of the vehicle body 2. An engine 6 is arranged below the hood 5 as a drive source. The engine 6 is, for example, configured as a diesel engine. However, it is not limited to this, and the engine 6 may, for example, be configured as a gasoline engine. Furthermore, an electric motor may be used as a drive source in addition to the engine 6, or instead of the engine 6.

An upper part of the vehicle body 2 on the rear of the hood 5 is provided with a cabin 7 for the driver to board. The left side of the cabin 7 is provided with a door 7*a* that pivots to open toward the front. The driver can get in and out of the cabin 7 by opening and closing the door 7*a*. The door 7*a* may be provided on the right side of the cabin 7, or on both the left and right sides of the cabin 7.

A steering wheel 8 and the driver's seat 9 are provided inside the cabin 7. The driver is capable of determining the advancing direction of the tractor 1 by being seated in the driver's seat 9 and performing steering operations with respect to the steering wheel 8. A shaft of the steering wheel 8 is covered by a steering column 8*a*. A display panel is provided inside a dashboard 8*b* above the steering column 8*a*. The display panel displays information, warning lights, and the like for each instrument installed on the tractor 1.

Figure 2:
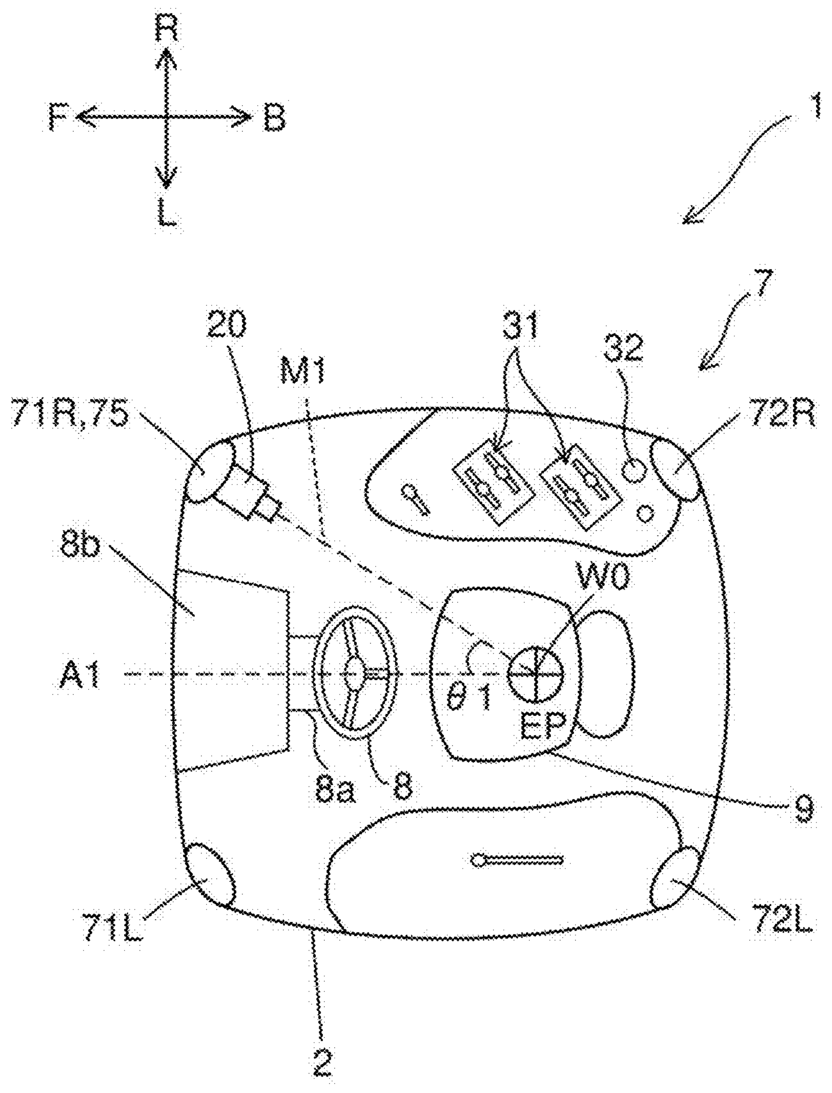
FIG. 2 is a plan view schematically showing a configuration of the inside of a cabin of the tractor.

The cabin 7 described above is provided with a roof 7*b*. The roof 7*b* is located above the driver's seat 9 and covers the driver's seat 9. That is, the tractor 1 is provided with a cabin 7 that covers the driver's seat 9. FIG. 2 is a plan view schematically showing a configuration of the inside of the cabin 7 of the tractor 1. The roof 7*b* is supported on the vehicle body 2 by four pillars. The four pillars are a right-front pillar 71R, a left-front pillar 71L, a right-rear pillar 72R, and a left-rear pillar 72L. The right-front pillar 71R is a first front pillar arranged on the right-front of the driver's seat 9. The left-front pillar 71L is a second front pillar arranged on the left-front of the driver's seat 9. The right-rear pillar 72R is arranged on the right-rear of the driver's seat 9. The left-rear pillar 72L is arranged on the left-rear the driver's seat 9. In this way, the cabin 7 includes the right-front pillar 71R as the first front pillar and the left-front pillar 71L as the second front pillar, which are arranged further forward than the driver's seat 9, and on one side and another side in the width direction of the driver's seat 9.

A three-point link mechanism is provided on the rear side of the vehicle body 2. The three-point link mechanism includes a pair of left and right lower links 10 and upper links 11. The ground work machine mentioned above is configured so as to be attachable to the three-point link mechanism. Furthermore, a raising/lowering device (not shown) having a hydraulic system such as a raising/lowering cylinder is provided on the rear side of the vehicle body 2. The raising/lowering device is capable of raising and lowering the ground work machine by raising and lowering the three-point link mechanism.

The tractor 1 further includes an antenna unit 12. The antenna unit 12 is a positioning device that includes an inertial measurement unit (IMU), a global navigation satellite system (GNSS) antenna, and the like, and detects the position of the vehicle body 2 based on signals transmitted from positioning satellites (not shown). The antenna unit 12 is attached, for example, to the roof 7*b* of the cabin 7, but may be attached to a position other than the roof 7*b*. The position information of the tractor 1 acquired by the antenna unit 12 is transmitted to an assist monitor device 40 (see FIGS. 5 and 6) described later, and is used to generate information that is provided to the driver (such as the straight travel routes of the tractor 1).

[2. Monitoring Device]

Figure 3:
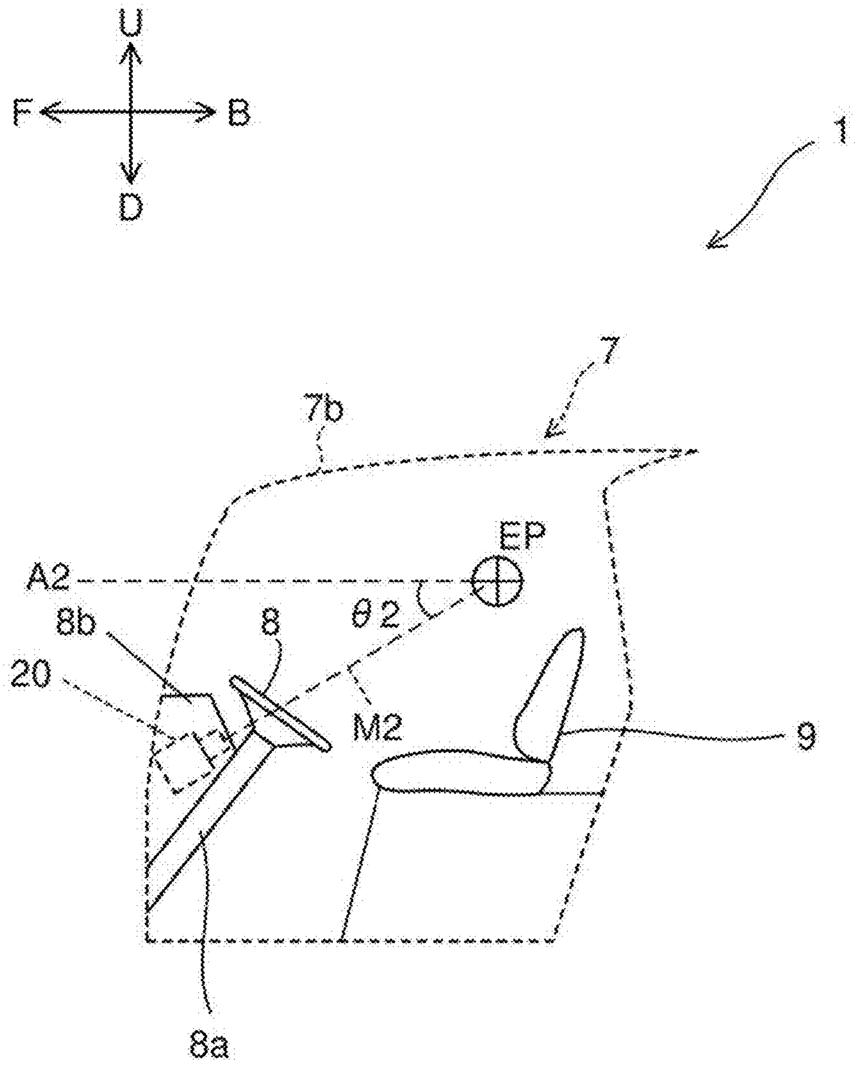
FIG. 3 is a left side view showing enlarged the inside of the cabin.

FIG. 3 is a left side view showing enlarged the inside of the cabin 7. As shown in FIGS. 2 and 3, the tractor 1 of the present embodiment includes a monitoring device 20. The monitoring device 20 monitors the driver seated in the driver's seat 9. In the present embodiment, in order to prevent accidents during operation of the tractor 1, the monitoring device 20 monitors at least one of drowsiness, dozing, inattention, a physical state, and an undrivable state of the driver. The monitoring device 20 is attached, for example, to the right-front pillar 71R of the cabin 7. As a result of installing the monitoring device 20 in such a position, it is possible to monitor not only the driver's face but also the posture and movements of the upper body (the same applies when the monitoring device 20 is attached to the left-front pillar 71L of the cabin 7).

Here, because the driver of the work vehicle (here, the tractor 1) makes large movements, if the imaging area of the monitoring device 20 is limited to only the driver's face, it is possible to lose sight of the driver. For example, a situation may occur in which the driver's upper body has leaned significantly forward, such that it is not possible for the driver's face to be captured by the monitoring device 20, or the driver's upper body may face the opposite side to the monitoring device 20, such that the driver's face cannot be captured. As a result of setting the driver's upper body as the imaging area of the monitoring device 20, it is possible to monitor the driver without losing sight of the driver. Furthermore, even when the monitoring device 20 loses sight of the driver's face, the cause (such as the reason being movement of the driver's upper body) can be determined. If the driver's face cannot be captured by the monitoring device 20 due to the situations described above, it is not problematic if this is a temporary situation, but if the situation continues for a threshold period of time or more, it can be determined that an undrivable state has occurred. Note that details of the position of the monitoring device 20 will be described later.

Figure 4:
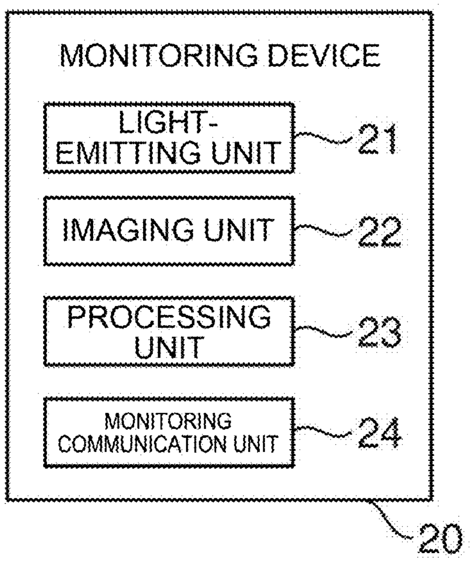
FIG. 4 is a block diagram schematically showing a configuration of a monitoring device provided in the tractor.

FIG. 4 is a block diagram schematically showing a configuration of the monitoring device 20. The monitoring device 20 includes a light-emitting unit 21, an imaging unit 22, a processing unit 23, and a monitoring communication unit 24. The light-emitting unit 21 is a light source that emits light toward a preset eye point EP, and is configured by, for example, a light-emitting diode that emits infrared light. Here, the eye point EP is a point corresponding to the position of the eyes of the driver when the driver is seated in the driver's seat 9. The eye point EP is preset in accordance with a standard as a position that is a predetermined distance above the driver's seat 9. As a result of the light-emitting unit 21 emitting light toward the eye point EP, it is possible to illuminate the driver's face when the driver is seated in the driver's seat 9.

The imaging unit 22 is a camera that acquires images by capturing the face of the driver seated in the driver's seat 9. For example, the imaging unit 22 is capable of acquiring images of the driver's face by receiving the light that has been emitted from the light-emitting unit 21 and reflected by the driver's face. The images acquired by the imaging unit 22 may be still images acquired at predetermined frame intervals, or a video acquired by consecutive capture.

The processing unit 23 determines the state of the driver by performing predetermined analysis processing with respect to the images acquired by the imaging unit 22. For example, the processing unit 23 acquires, from the images captured by the imaging unit 22, features such as the extent to which the driver's eyes or mouth are open or closed, the opening and closing speed, and the direction of the line of sight, and when a state in which the driver does not appear in the images from the imaging unit 22 (a state in which the driver has not been captured) continues for a predetermined period of time, extracts the period of time that the driver has not been captured, identifies the presence or absence of drowsiness, the presence or absence of dozing, the presence or absence of inattention, and the presence or absence of an undrivable state of the driver from the extracted features, and outputs the result to the outside. Note that the undrivable state referred to here not only includes an undrivable state caused by a loss of consciousness or sudden illness of the driver, such as a stroke, but also a state where the driver has fallen off or become separated from the driver's seat 9.

The processing unit 23 described above is configured by an arithmetic device specialized for real-time image processing, such as a graphics processing unit (GPU). For example, by training the processing unit 23 in advance using machine learning, it is possible to cause the processing unit 23 to extract and identify features from input images. Furthermore, the processing unit 23 can also recognize the driver's blood flow based on color changes over a predetermined period in specific locations of the image, and acquire heart rate or blood pressure data (vital data). This allows the processing unit 23 to determine whether or not the driver's physical state is satisfactory based on the acquired vital sign data.

The monitoring communication unit 24 is an interface for performing communication with the outside, and includes a terminal or connector that is connected to a cable. The monitoring communication unit 24 may be configured to wirelessly communicate with the outside. In this case, the monitoring communication unit 24 includes an antenna, a transmitting/receiving circuit, a modulation circuit, a demodulation circuit, and the like.

[3. Position of Monitoring Device]

Next, details of the position of the monitoring device 20 will be described. As shown in FIG. 2, the tractor 1 includes a support member 75. The support member 75 supports the monitoring device 20. For example, the monitoring device 20 is attached to the right-front pillar 71R of the cabin 7 via an attachment member such as a stay. In other words, the right-front pillar 71R supports the monitoring device 20 via the attachment member. Therefore, in this case, the right-front pillar 71R constitutes the support member 75.

Here, in FIG. 2, an axis passing through the center W0 of the driver's seat 9 in the width direction and extending along the front-rear direction is defined as a reference axis A1. In the present embodiment, because the monitoring device 20 is supported by the right-front pillar 71R, the monitoring device 20 is arranged in a position that further forward than the driver's seat 9, and offset in the width direction of the driver's seat 9 with respect to the reference axis A1. In the present embodiment, an angle θ1 formed between the reference axis A1 and an axis M1 connecting the monitoring device 20 and the eye point EP in a plan view is set to about 35°. Note that the angle θ1 is appropriately set in a range of greater than 0° and 50° or less.

For example, in the monitoring device 20 (in particular, the processing unit 23), when identification (detection) of the state of the driver is performed by extracting features from images captured in a state where the driver's face is facing the side, the extent to which the driver's eyes are open in the images (the area of the eyeballs) differs from that of a front view. Consequently, in reality, even when the driver is not being inattentive or dozing, there may be cases where the driver is erroneously detected as being inattentive or the like. For this reason, as the images used for feature extraction, it is desirable to use images to the extent possible that capture the driver from the direction that the driver's face is facing.

As a result of arranging the monitoring device 20 as shown in FIG. 2, even if the driver seated in the driver's seat 9 often looks to the right while working, the monitoring device 20 can capture and monitor the driver from the direction in which the driver's face is facing (from the right-front side of the driver). As a result, the frequency with which the monitoring device 20 erroneously detects the condition of the driver (the presence or absence of inattention, the presence or absence of drowsiness, the presence or absence of dozing, a physical state, or the presence or absence of an undrivable state) can be reduced, and the state of the driver can be accurately detected. That is, the monitoring device 20 that monitors the driver can be installed in an appropriate position that emphasizes the driver's posture while driving (in particular, the direction of the face, and the posture and movement of the upper body), and the state of the driver seated in the driver's seat 9 can be accurately detected.

In addition, in the tractor 1, with the exception of some levers, it is frequently the case that various operation levers 31, operation buttons 32, and the like, are arranged together as shown in FIG. 2. In this case, the driver will often tilt the face to the right side in order to operate the operation levers 31 and the like. Therefore, in the tractor 1, in order to accurately monitor the state of the driver with the monitoring device 20, it is desirable for the monitoring device 20 to monitor the driver from the right-front side. In this respect, as described in the present embodiment, among the right-front pillar 71R serving as the first front pillar, and the left-front pillar 71L serving as the second front pillar, it is highly effective for the support member 75 that supports the monitoring device 20 to be constituted by the right-front pillar 71R that is arranged relatively on the right side.

Furthermore, in the present embodiment, as shown in FIG. 3, the position in the up-down direction of the monitoring device 20, which is supported by the support member 75 (right-front pillar 71R), is lower than the eye point EP. In the present embodiment, in a side view, an angle (angle of depression) θ2 formed between an axis A2 extending through the eye point EP in the front-rear direction, and an axis M2 connecting the monitoring device 20 and the eye point EP is set to about 30°. Note that the angle θ2 is appropriately set in a range of greater than 0° and 45° or less.

The monitoring device 20 may be provided with a structure that enables a user (driver) to adjust the position of the monitoring device 20 such that the monitoring device 20 can be arranged according to the height of the driver in a position that satisfies the angle shown in FIG. 3. In this case, an online calibration function, that is, a function that performs automatic correction according to the camera position, is used to adjust the sensing function of the camera according to the height of the driver.

The driver that is driving the tractor 1 sometimes looks at the front wheels 3 (see FIG. 1) while performing work, and in this case, the driver's line of sight faces downward. In order to accurately monitor the state of the driver when the driver is facing downward, it is desirable that the monitoring device 20 monitors the driver from diagonally forward and downward of the driver. In this respect, it is desirable for the monitoring device 20 to be in a position that is lower than the eye point EP as in the present embodiment.

[4. Integration of Monitoring Device with Assist Monitor Device]

Figure 5:
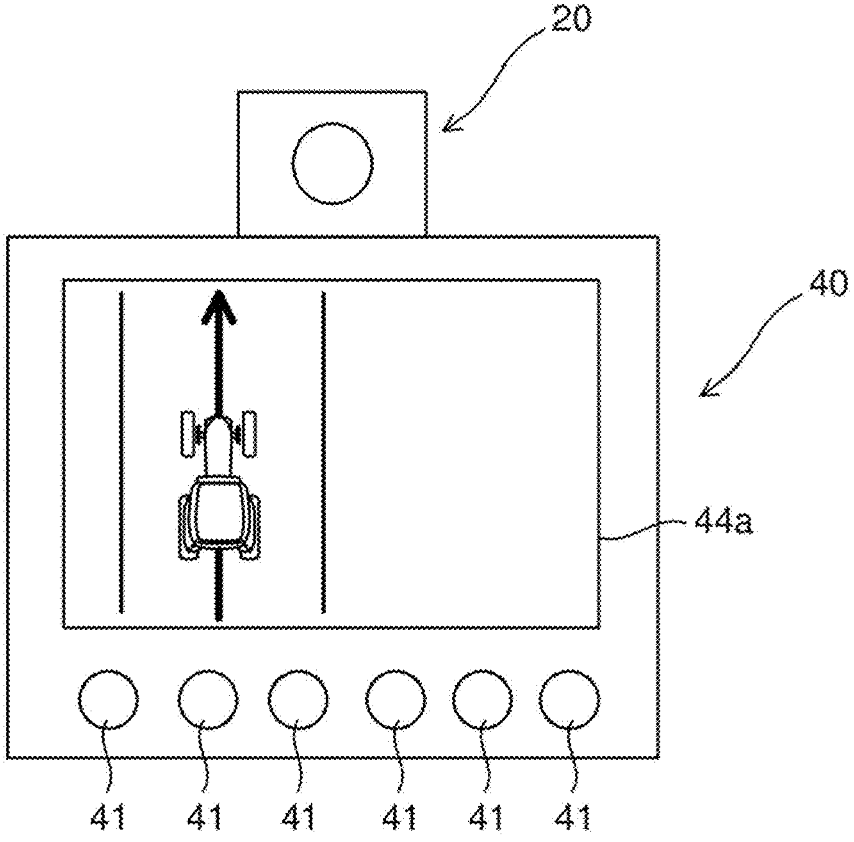
FIG. 5 is a front view schematically showing the appearance of an assist monitor device provided in the tractor.
Figure 6:
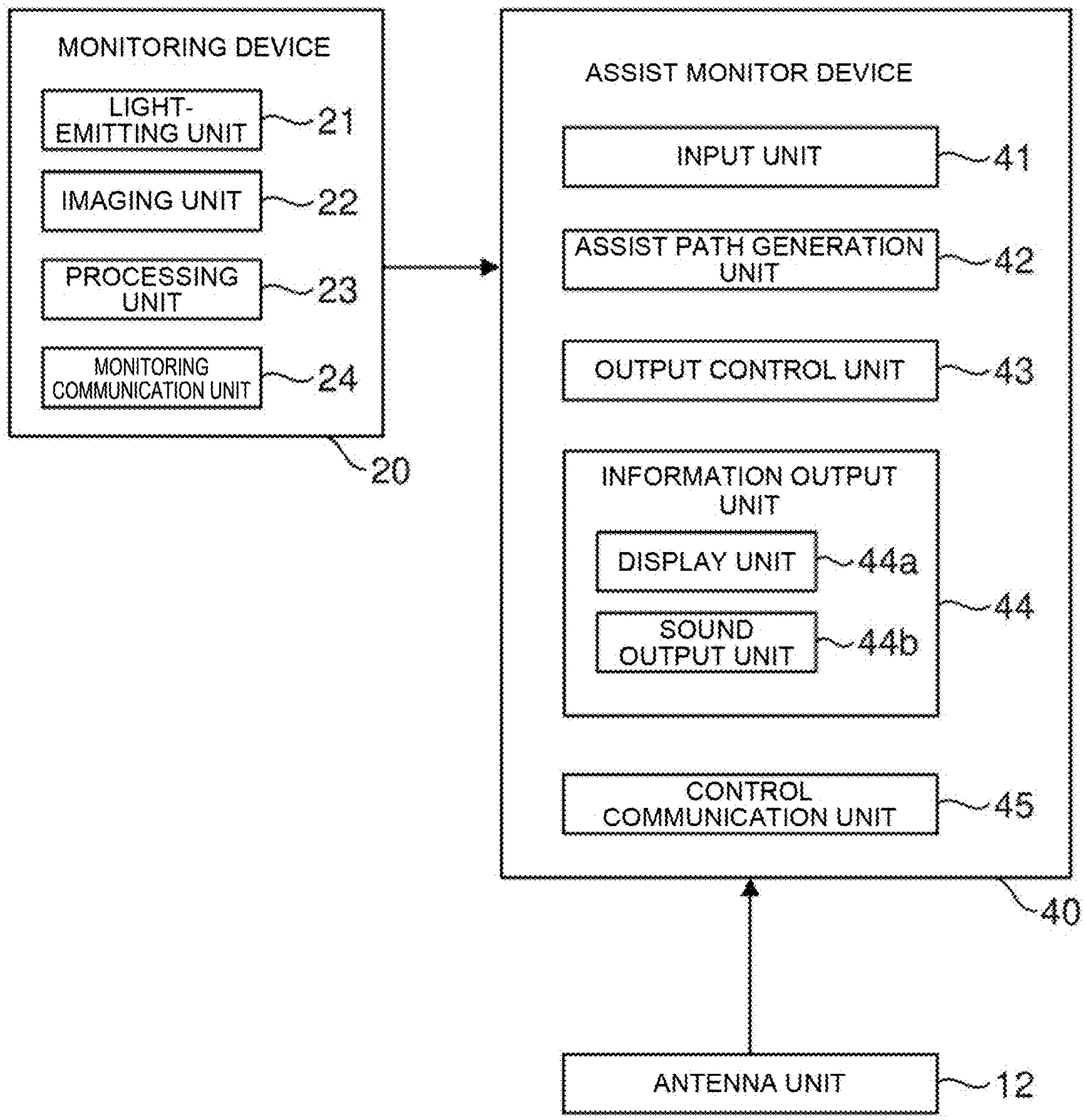
FIG. 6 is a block diagram schematically showing a configuration of the assist monitor device.

The tractor 1 of the present embodiment may further include an assist monitor device 40. The assist monitor device 40 is a control device that assists the automatic straight travel of the tractor 1. FIG. 5 is a front view schematically showing the appearance of the assist monitor device 40. FIG. 6 is a block diagram schematically showing a configuration of the assist monitor device 40.

The monitoring device 20 is integrally provided with the assist monitor device 40. In the present embodiment, the monitoring device 20 is integrally provided in an upper portion of the assist monitor device 40.

However, the position of the monitoring device 20 with respect to the assist monitor device 40 is not particularly limited. For example, the monitoring device 20 may be integrally provided in a side surface of the assist monitor device 40. Furthermore, the monitoring device 20 may be integrally provided with the assist monitor device 40 when the assist monitor device 40 is manufactured and shipped, or may be attached to the assist monitor device 40 after separate shipping of the assist monitor device 40 by using a bracket or the like.

From the perspective of arranging the monitoring device 20 and the assist monitor device 40 together in a compact manner, it is preferable that the monitoring device 20 is integrally provided with the assist monitor device 40 as in the present embodiment.

As shown in FIGS. 5 and 6, the assist monitor device 40 includes an input unit 41, an assist path generation unit 42, an output control unit 43, an information output unit 44, and a control communication unit 45.

The input unit 41 is an operation unit for the driver to input a start point and an end point of straight travel and the like, and is configured, for example, by push buttons. Note that the input unit 41 may be configured by a touch panel-type input unit.

When a travel mode that assists straight travel is used, the driver causes the tractor 1 to actually travel to the start point of the straight travel, and inputs the start point using the input unit 41. As a result, the position information of the start point is acquired. Next, the driver causes the tractor 1 to actually travel to the end point of the straight travel, and inputs the end point using the input unit 41. As a result, the position information of the end point is acquired.

The assist path generation unit 42 generates a reference line by connecting the start point and the end point of the straight travel that has been input using the input unit 41 with a straight line. Then, the assist path generation unit 42 generates, as straight routes, lines that are parallel to the reference line with a predetermined spacing (corresponding to the width of the tractor 1).

The output control unit 43 controls the information output unit 44. The information output unit 44 includes a display unit 44*a* and a sound output unit 44*b*. The display unit 44*a* is configured, for example, by a liquid crystal display device. The sound output unit 44*b* is configured, for example, by a buzzer. Note that the output control unit 43 may also function as a main control unit that controls the operation of each unit of the assist monitor device 40 other than the information output unit 44.

Such an output control unit 43 is configured by, for example, a central processing unit (CPU). An operation program of the output control unit 43 is stored in a storage unit (not shown) of the assist monitor device 40. Note that a configuration is also possible in which the main control unit mentioned above is provided separately to the output control unit 43.

The output control unit 43 displays the straight routes generated by the assist path generation unit 42 on the display unit 44*a*. At this time, based on the position information of the tractor 1 detected by the antenna unit 12, the output control unit 43 also displays the current travel position of the tractor 1 performing straight travel on the display unit 44*a* superimposed on the straight routes. Furthermore, at the time of an abnormality, the output control unit 43 also causes a warning sound to be generated from the sound output unit 44*b*. For example, when the tractor 1 completes straight travel and needs to turn, and a turning operation is not manually performed, a warning sound is emitted from the sound output unit 44*b* to alert the driver.

The control communication unit 45 is an interface for performing communication with the monitoring device 20 and the antenna unit 12, and includes an input/output terminal that is connected with a cable or wiring. Note that the control communication unit 45 may have a configuration that performs wireless communication with the outside by further including an antenna, a transmitting/receiving circuit, a modulation circuit, a demodulation circuit, and the like.

In the present embodiment, the output control unit 43 of the assist monitor device 40 outputs a warning from the information output unit 44 when the monitoring device 20 described above has detected an abnormality of the driver. For example, when the monitoring device 20 has detected an abnormality (for example, dozing) of the driver, the output control unit 43 causes the display unit 44*a* to display a warning such as "driver abnormality detected". Furthermore, for example, the output control unit 43 may output a warning sound from the sound output unit 44*b* when the monitoring device 20 detects an abnormality of the driver.

In this way, when the monitoring device 20 has detected an abnormality of the driver, by using the information output unit 44 of the assist monitor device 40 as a member that produces a warning, it is not necessary to provide dedicated equipment that outputs a warning separately to the information output unit 44.

Also, when the monitoring device 20 has detected an abnormality of the driver, by displaying a warning display on the display unit 44*a*, the information provided to the driver is aggregated and displayed on the display unit 44*a* of the assist monitor device 40. This increases the convenience for the driver.

In addition, when the monitoring device 20 has detected an abnormality of the driver, by outputting a warning sound using the sound output unit 44*b* of the assist monitor device 40, it is not necessary to separately provide dedicated equipment that outputs a warning sound.

[5. Modifications]

Figure 7:
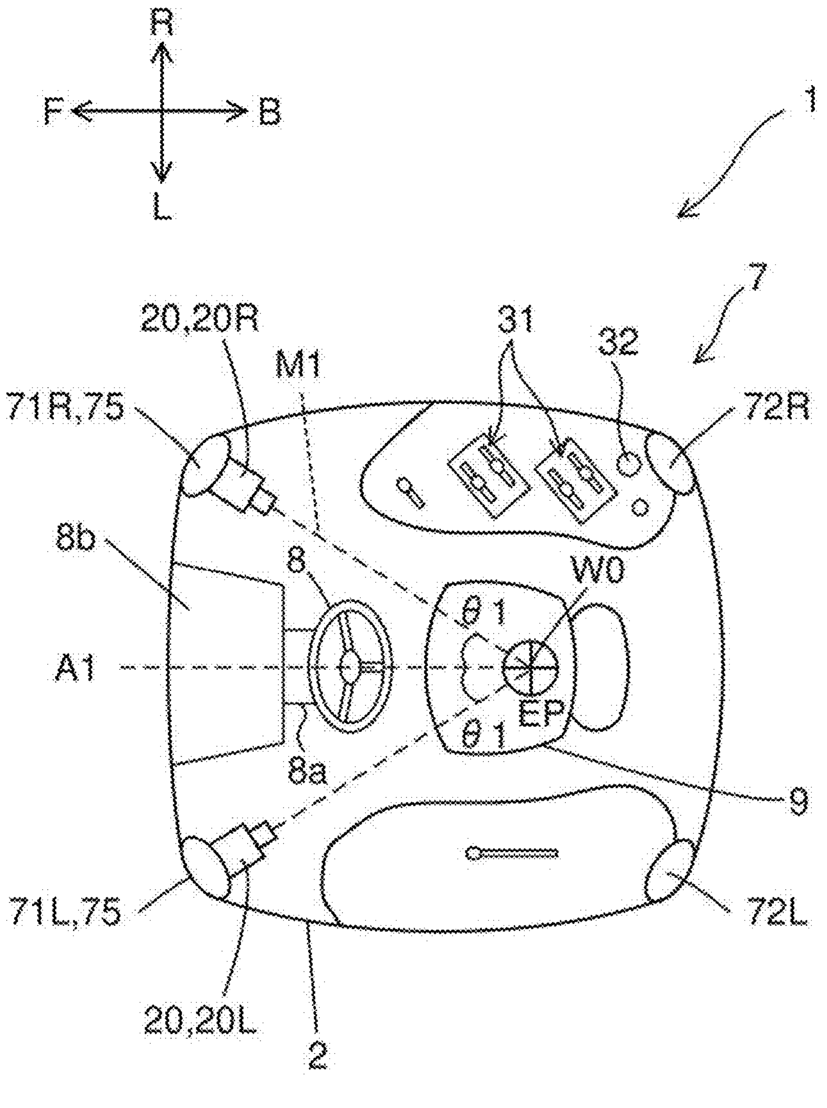
FIG. 7 is a plan view schematically showing a configuration of a modification of the tractor.

FIG. 7 is a plan view schematically showing a configuration of a modification of the tractor 1. As shown in the drawing, the monitoring device 20 may be supported by each of the right-front pillar 71R and the left-front pillar 71L, and monitor the driver. That is, the monitoring device 20 may be configured to include a right side monitoring device 20R that is supported by the right-front pillar 71R, and a left side monitoring device 20L that is supported by the left-front pillar 71L. In this case, the right-front pillar 71R and the left-front pillar 71L each constitute the support member 75 that supports the monitoring device 20.

In the configuration of FIG. 7, when the driver performs work by looking toward the right side, an abnormality of the driver can be detected based on the monitoring by the right side monitoring device 20R. Furthermore, when the driver performs work by looking toward the left side, an abnormality of the driver can be detected based on the monitoring by the left side monitoring device 20L. That is, regardless of whether the work is performed with the driver's face tilted to the left or right direction, it is possible to accommodate both cases, and the state of the driver can be more accurately detected.

Although not illustrated, the monitoring device 20 may be supported by only the left-front pillar 71L, and monitor the driver. In this case, the left-front pillar 71L constitutes the support member 75 that supports the monitoring device 20. In such a configuration, when the driver performs work by looking toward the left side with a high frequency, an abnormality of the driver can be accurately detected based on the monitoring by the monitoring device 20. Therefore, when the driver performs work while looking toward the left side with a high frequency, a configuration in which only the left-front pillar 71L supports the monitoring device 20 becomes effective.

From the above description, in the present embodiment, it can be said that the support member 75 that supports the monitoring device 20 may be configured by at least one of the right-front pillar 71R serving as the first front pillar, and the left-front pillar 71L serving as the second front pillar.

Figure 8:
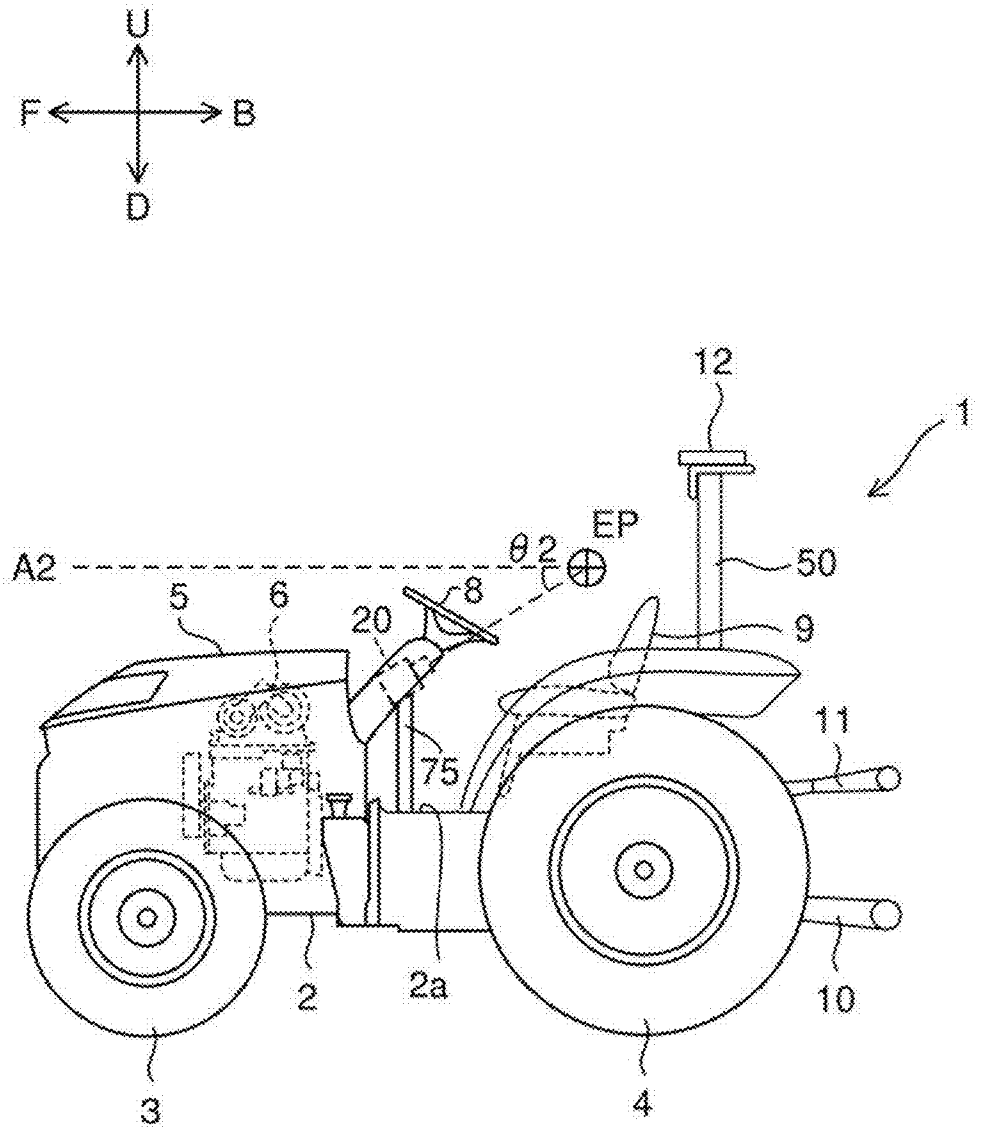
FIG. 8 is a left side view schematically showing a configuration of another modification of the tractor.
Figure 9:
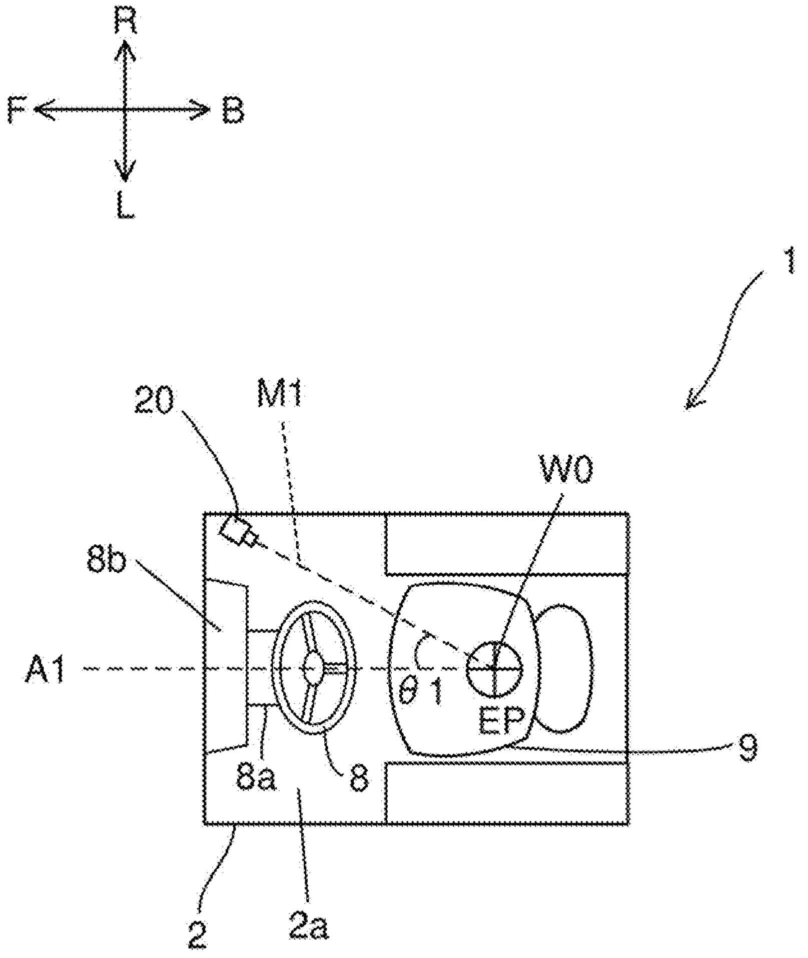
FIG. 9 is a plan view showing a configuration of the main parts of the tractor in FIG. 8.

FIG. 8 is a left side view schematically showing a configuration of another modification of the tractor 1. FIG. 9 is a plan view of the main parts of the tractor 1 in FIG. 8. The tractor 1 shown in FIGS. 8 and 9 does not include the cabin 7 shown in FIG. 1 and the like, and includes a ROPS frame 50. The ROPS frame 50 is a guard provided for the purpose of protecting the driver in the event the tractor 1 rolls over, and for example, is provided standing with an inverted letter-U shape on the vehicle body 2 on a rear part of the driver's seat 9.

The vehicle body 2 is provided with a floor 2*a*. That is, the tractor 1 includes the floor 2*a*. The floor 2*a* is positioned on a forward, lower part of the driver's seat 9, and extending in the width direction of the driver's seat 9. The driver is able to get on and off the driver's seat 9 using the floor 2*a* as a footing.

In this way, when the tractor 1 is a type that does not include the cabin 7 (non-cabin specification), the support member 75 may be provided standing on the floor 2*a* to support the monitoring device 20. The position in the left-right direction and the position in the up-down direction of the monitoring device 20 at this time may be set in the ranges of the same angles θ1 and θ2 as in the tractor 1 shown in FIGS. 2 and 3. The support member 75 is constituted by, for example, a support pillar, and supports the monitoring device 20 via a mounting jig (not shown). The mounting jig may be the same member as the attachment member described above that is used in the type including the cabin, or may be a different member.

Even in the case of the tractor 1 having a non-cabin specification, from the viewpoint of accurately monitoring the state of the driver, as shown in FIG. 8, it is desirable that the monitoring device 20 is supported by the support member 75 in the position described above.

[6. Supplementary Description]

In the present embodiment, the tractor 1 travels in accordance with the driving performed by a driver. However, a configuration is possible in which autonomous travel is performed based on instructions from a wireless communication terminal.

In the present embodiment, a case where the monitoring device 20 is installed in the tractor 1 has been described. However, it is also possible to install the monitoring device 20 in the same position as the present embodiment in an agricultural machine other than the tractor 1, such as a combine harvester or a rice transplanter, and monitor the state of the driver. It is also possible to install the monitoring device 20 in the same position as the present embodiment in a construction machine such as a hydraulic excavator (including a backhoe) or a wheel loader, and monitor the state of the driver.

In particular, when the monitoring device 20 is installed in a hydraulic excavator, the position in the up-down direction of the monitoring device 20 may be a higher position than the eye point EP. The position in the left-right direction of the monitoring device 20 is a position that is offset in the left-right direction from the front of the driver. When performing work with a hydraulic excavator, depending on the work location, the direction of the line of sight of the driver may be diagonally upward with respect to the forward direction of the driver. In cases where the driver frequently performs work while looking diagonally upward, a configuration in which the monitoring device 20 is installed in a position higher than the eye point EP is effective from the viewpoint of accurately detecting an abnormality of the driver based on monitoring by the monitoring device 20.

[7. Supplementary Notes]

The work vehicle such as the tractor 1 described in the present embodiment can also be represented by a work vehicle described in the following supplementary notes.

A work vehicle according to supplementary note (1) comprises:

a monitoring device that monitors a driver that is seated in a driver's seat; and a support member that supports the monitoring device; wherein in a plan view, when a direction perpendicular to a width direction of the driver's seat is a front-rear direction, and a side the driver faces in the front-rear direction when seated in the driver's seat is a front side, the monitoring device is arranged in a position further forward than the driver's seat, and is offset in the width direction of the driver's seat with respect to a reference axis along the front-rear direction that passes through a center of the driver's seat in the width direction, and is supported by the support member.

A work vehicle according to supplementary note (2) is the work vehicle according to supplementary note (1), further comprising a cabin that covers the driver's seat, wherein the cabin is further forward than the driver's seat, and has a first front pillar and a second front pillar that are arranged on one side and another side in the width direction of the driver's seat, and the support member is constituted by at least one of the first front pillar and the second front pillar.

A work vehicle according supplementary note (3) is the work vehicle according to supplementary note (2) wherein when the one side in the width direction of the driver's seat is a right side, and the another side is a left side, the support member is constituted by a pillar that is arranged relatively on the right side among the first front pillar and the second front pillar.

A work vehicle according to supplementary note (4) is the work vehicle according to supplementary note (1), further comprising a floor positioned on a forward, lower portion of the driver's seat, and extending in the width direction of the driver's seat, wherein the support member is provided standing on the floor, and supports the monitoring device.

A work vehicle according to supplementary note (5) is the work vehicle according to any one of supplementary notes (1) to (4), wherein the monitoring device monitors for least one of drowsiness, dozing, inattention, a physical state, and an undrivable state of the driver.

A work vehicle according to supplementary note (6) is the work vehicle according to any one of supplementary notes (1) to (5), further comprising an assist monitor device that assists automatic straight travel, wherein the monitoring device is integrally provided with the assist monitor device.

A work vehicle according to supplementary note (7) is the work vehicle according to supplementary note (6), wherein the assist monitor device is provided with an information output unit and an output control unit, and the output control unit outputs a warning from the information output unit when the monitoring device detects an abnormality of the driver.

A work vehicle according to supplementary note (8) is the work vehicle according to supplementary note (7), wherein the information output unit includes a display unit, and the output control unit outputs a warning on the display unit when the monitoring device detects an abnormality of the driver.

A work vehicle according to supplementary note (9) is the work vehicle according to supplementary note (7) or (8) wherein the information output unit includes a sound output unit, and the output control unit outputs a warning sound from the sound output unit when the monitoring device detects an abnormality of the driver.

A work vehicle according to supplementary note (10) is the work vehicle according to any one of supplementary notes (1) or (9) wherein a position in up-down direction of the monitoring device that is supported by the support member is lower than an eye point corresponding to a position of an eye of the driver seated in the driver's seat.

Although an embodiment of the present invention has been described above, the scope of the present invention is not limited to the embodiment. The present invention can be implemented by being expanded or changed within a scope not departing from the gist of the invention.

INDUSTRIAL APPLICABILITY

The present invention can be used in work vehicles such as agricultural machines and construction machines.

REFERENCE SIGNS LIST

1 Tractor (work vehicle)
**2*a*** Floor
7 Cabin
9 Driver's seat
20 Monitoring device
20L Left side monitoring device
20R Right side monitoring device
40 Assist monitor device
43 Output control unit
44 Information output unit
**44*a*** Display unit
**44*b*** Sound output unit
71L Left-front pillar (second front pillar, support member)
71R Right-front pillar (first front pillar, support member)
75 Support member
A1 Reference axis
EP Eye point
W0 Center

The invention claimed is:

1. A work vehicle comprising:

a monitoring device that monitors a driver that is seated in a driver's seat; and a support member that supports the monitoring device; wherein in a plan view, when a direction perpendicular to a width direction of the driver's seat is a front-rear direction, and a side the driver faces in the front-rear direction when seated in the driver's seat is a front side, the monitoring device is arranged in a position further forward than the driver's seat, and is offset in the width direction of the driver's seat with respect to a reference axis along the front-rear direction that passes through a center of the driver's seat in the width direction, and is supported by the support member.

2. The work vehicle according to claim 1, further comprising a cabin that covers the driver's seat, wherein the cabin is further forward than the driver's seat, and comprises a first front pillar and a second front pillar that are arranged on one side and another side, respectively, in the width direction of the driver's seat, and the support member is constituted by at least one of the first front pillar and the second front pillar.

3. The work vehicle according to claim 2, wherein when the one side in the width direction of the driver's seat is a right side, and the another side is a left side, the support member is constituted by a pillar that is arranged relatively on the right side among the first front pillar and the second front pillar.

4. The work vehicle according to claim 1, further comprising a floor positioned on a forward, lower portion of the driver's seat, and extending in the width direction of the driver's seat, wherein the support member is provided standing on the floor, and supports the monitoring device.

5. The work vehicle according to claim 1, wherein the monitoring device monitors for least one of drowsiness, dozing, inattention, a physical state, and an undrivable state of the driver.

6. The work vehicle according to claim 1, further comprising an assist monitor device that assists automatic straight travel, wherein the monitoring device is integrally provided with the assist monitor device.

7. The work vehicle according to claim 6, wherein the assist monitor device is provided with an information output unit and an output control unit, and the output control unit outputs a warning from the information output unit when the monitoring device detects an abnormality of the driver.

8. The work vehicle according to claim 7, wherein the information output unit includes a display unit, and the output control unit outputs a warning on the display unit when the monitoring device detects the abnormality of the driver.

9. The work vehicle according to claim 7, wherein the information output unit includes a sound output unit, and the output control unit outputs a warning sound from the sound output unit when the monitoring device detects the abnormality of the driver.

10. The work vehicle according to claim 1, wherein a position in an up-down direction of the monitoring device that is supported by the support member is lower than an eye point corresponding to a position of an eye of the driver seated in the driver's seat.

* * * * *